United States Patent

Di Tommaso et al.

(10) Patent No.: US 6,414,495 B1
(45) Date of Patent: Jul. 2, 2002

(54) CONTINUOUS TIME PULSE DETECTION SYSTEM UTILIZING AUTOMATIC BIAS REMOVAL

(75) Inventors: Anthony M. Di Tommaso, Cranberry Township; Kevin Dowdell, Pittsburgh, both of PA (US)

(73) Assignee: ABB Automation Inc., Wickliffe, OH (US)

( * ) Notice: Subject to any disclaimer, the term of this patent is extended or adjusted under 35 U.S.C. 154(b) by 0 days.

(21) Appl. No.: 09/710,107

(22) Filed: Nov. 10, 2000

(51) Int. Cl.[7] .............................................. G01R 27/02
(52) U.S. Cl. ...................................................... 324/604
(58) Field of Search ............................. 324/604, 76.65, 324/76.79, 207.12, 207.2, 248, 520; 327/58, 59, 60, 78, 79; 360/46, 51, 53; 375/276, 318, 334, 342; 369/44.34, 53.3; 372/26, 31, 38.01

(56) References Cited

U.S. PATENT DOCUMENTS 4,575,683 A * 3/1986 Roberts et al. ................ 329/50
5,365,120 A * 11/1994 Main ............................ 327/77
6,192,861 B1 * 2/2001 Hamada et al. ......... 123/406.61

* cited by examiner

*Primary Examiner*—N. Le
*Assistant Examiner*—Etienne LeRoux
(74) *Attorney, Agent, or Firm*—Michael M. Rickin

(57) ABSTRACT

An event marker is generated from the periodic input voltage received from the notch in a shaft of a rotating machine. Positive and negative peak voltages each attenuated by ½ are detected from the periodic input voltage. The attenuated detected positive and negative peak voltages are combined to provide a bias voltage which is subtracted from the periodic input voltage to give an output voltage representative of the event marker.

15 Claims, 2 Drawing Sheets

$V_\sigma = KV_I(t)$    WHERE $V_{IN} = V_I(t) + V_C, -V_{DD} \leq V_C \leq V_{DD}$ $$V_{BIAS} = \frac{(KV_{IN})^{pk+}}{2} + \frac{(KV_{IN})^{pk-}}{2} = AVG(KV_{IN})$$

$V_\sigma = KV_I(t)$    WHERE $V_{IN} = V_I(t) + V_C, -V_{DD} \leq V_C \leq V_{DD}$

CONTINUOUS TIME PULSE DETECTION SYSTEM UTILIZING AUTOMATIC BIAS REMOVAL

FIELD OF THE INVENTION

This invention relates to the generation of an event marker and more particularly to the generation of such a marker from a notch in a rotating shaft.

DESCRIPTION OF THE PRIOR ART

In the design of protection and diagnostic electronics associated with a rotating machine such as a turbine generator, an "event" marker is often used to identify particular system parameters. The "event" marker is usually generated whenever a sensor detects a notch in the shaft of the turbine. Because of the notch shape, the result is a trapezoidal pulse waveform. When the turbine shaft is in motion, these pulses combine into an alternating square wave. Often, a DC voltage offsets the square wave. This voltage is not used in the calculation of the system parameters and as such should be removed.

There are several techniques that have been used in the prior art to remove the DC offset voltage. Three such prior art techniques are described below in conjunction with FIGS. 1–3.

The first such technique shown in circuit 10 of FIG. 1, utilizes a fixed reference voltage, $V_{ref}$, and a potentiometer $R_v$. With the potentiometer $R_v$, the reference voltage $V_{ref}$ can be changed to a value that eliminates the DC bias from the raw signal $V_{in}$. This method provides the greatest performance to cost ratio (which may not be the greatest benefit to cost ratio). The waveforms below FIG. 1 which are also applicable to the other prior art circuits shown in FIGS. 2 and 3 and the circuit of the present invention shown in FIG. 4 show the input signal $V_{in}$, below the output voltage $V_{out}$ of each circuit and also show the voltage with the DC bias removed at the input to the comparator 12 of FIG. 1.

The main disadvantage with circuit 10 is the use of the potentiometer $R_v$. Rather than automatically detecting the bias and subtracting it from the input signal to the comparator 12, the circuit 10 needs manual intervention to adjust the signal in the event that the DC bias should vary. While the DC bias is considered non-time varying, the offset is not immune to variations in the turbine shaft. Because of this, frequent adjustment to circuit 10 are required.

As is shown in FIG. 1 and also in the prior art circuits of FIGS. 2 and 3 and the circuit of the present invention shown in FIG. 4, the comparator 12 of circuit 10 has hysteresis associated therewith. As those of ordinary skill in the art will appreciate, hysteresis is not necessary to the circuits shown in FIGS. 1–4 but is used in such circuits to eliminate signals at the output of the comparator as a result of noise on the input signal to the comparator.

The second such technique is shown in circuit 20 of FIG. 2. This design uses a microcontroller ($\mu$C) 22 in conjunction with an analog-to-digital converter (ADC) 24 and a digital-to-analog converter (DAC) 26 to detect the signal, calculate the average, and subtract the result from the input signal to the comparator 28. It should be appreciated that the summer shown in FIG. 2 at the input to comparator 28 is symbolic. As is well known the comparator has a positive input to which the attenuated input voltage $KV_{in}$ is connected and a negative input to which the average voltage calculated by microcontroller 22 and converters 24 and 26 is connected.

With circuit 20, automatic response to changes in bias is achieved. Taken as an independent circuit, circuit 20 is more costly than circuit 10 of FIG. 1. However, if a processor with a built in ADC and DAC is chosen, and the design is placed on a printed circuit board with other circuitry, then the cost of using a $\mu$C 22 can be distributed throughout the design.

The main disadvantage associated with circuit 20 is its dependence on a $\mu$C 22. When taken independently, circuit 20 is more costly than circuit 10. Taken in conjunction with other designs on a printed circuit board, circuit 20 has to deal with the demands of the other circuits on the $\mu$C 22. Depending on the functions required of the $\mu$C 22, this could create delays in response and reduce the bandwidth of the bias removal system.

The third such technique is circuit 30 shown in FIG. 3. Rather than subtract a voltage from the input signal $V_{in}$ in order to remove the bias, the bias is simply blocked by a capacitor 32. Due to the nature of the component, capacitor 22 only allows the alternating square wave to pass. If capacitor 32 were. an ideal capacitor, all non-time varying signals would be blocked and only the alternating signals are allowed to pass. Circuit 30 is considered the least expensive of the three prior art techniques to manufacture.

The main disadvantage with circuit 30 is the use of the capacitor 32. Since the capacitor 32 is not ideal, there is, some inductance and resistance built into capacitor 32. The non-idealities of capacitor 32 reduces the performance of circuit 30. In addition to the resistance inherent to capacitor 32, an attenuating filter to alternating signals is created between the capacitor 32 and the resistors in circuit 30. This attenuating filter further reduces the performance of circuit 30. As such, the performance to cost ratio of circuit 30 is not considered to be as high as that of circuit 10 of FIG. 1.

The equation shown below FIG. 3 also applies to the prior art circuits shown in FIGS. 1 and 2 and the circuit of the present invention shown in FIG. 4. In that equation $V_f(t)$ is the time varying voltage of the impulse (see the $V_{in}$ waveform of FIG. 1) and $V_c$ is the DC level associated with $V_{in}$.

The circuit of the present invention does not use a potentiometer or a $\mu$C or a capacitor and thus overcomes the deficiencies discussed above of the three prior art circuits 10, 20 and 30.

SUMMARY OF THE INVENTION

The present invention is a method for generating an event marker from the periodic input voltage, $V_{in}$, received from a notch in the shaft of a rotating machine.

The method has the steps of:

a) detecting and attenuating a positive peak in the periodic input voltage to produce a voltage $V_{in}^{pk+}/2$;

b) detecting and attenuating a negative peak in the periodic input voltage to produce a voltage $V_{in}^{pk-}/2$;

c) combining the produced voltages $V_{in}^{pk+}/2$ and $V_{in}^{pk-}/2$ to provide a bias cancelling voltage, $V_{bias}$ as follows:

$$V_{bias}=((V_{in})^{pk+})/2+((V_{in})^{pk-})/2;$$

and d) subtracting the bias cancelling voltage from the periodic input voltage to provide an output voltage representative of the event marker.

The present invention is also the combination of a rotating machine having a shaft with a notch therein and a circuit for generating an event marker from the periodic input voltage, $V_{in}$, received from the notch. The circuit has a detector for detecting and attenuating a positive peak in the periodic input voltage to produce a voltage $V_{in}^{pk+}/2$ and a detector for detecting and attenuating a negative peak in the periodic input voltage to produce a voltage $V_{in}^{pk-}/2$. The circuit further has a summer for combining the voltages $V_{in}^{pk+}/2$ and $V_{in}^{pk-}/2$ to produce a bias cancelling voltage, $V_{bias}$, which is equal to $((V_{in})^{pk+})/2+((V_{in})^{pk-})/2$. Additionally the circuit has a comparator having positive and negative inputs, the bias cancelling voltage received at the negative input and the periodic input voltage received at the positive input.

The present invention is also a circuit for generating an event marker from the periodic input voltage, $V_{in}$, received from a notch in the shaft. of a rotating machine. The circuit has a first means for producing from a detected and attenuated positive peak in the periodic input voltage a voltage $V_{in}^{pk+}/2$, and from a detected and attenuated negative peak in the periodic input voltage a voltage $V_{in}^{pk-}/2$ and providing therefrom a bias cancelling voltage, $V_{bias}$, which is equal to $((V_{in})^{pk+})/2+((V_{in})^{pk-})/2$. The circuit also has a second means for subtracting the bias cancelling voltage from the periodic input voltage to provide an output voltage representative of the event marker.

The invention is further a circuit for generating an event marker from the periodic input voltage, $V_{in}$, received from a notch in the shaft of a rotating machine. The circuit has a detector for producing from a detected and attenuated positive peak in the periodic input voltage a voltage $V_{in}^{pk+}/2$ and a detector for producing from a detected and attenuated negative peak in the periodic input voltage a voltage $V_{in}^{pk-}/2$. The circuit also has a summer for combining the voltages $V_{in}^{pk+}/2$ and $V_{in}^{pk-}/2$ to produce a bias cancelling voltage, $V_{bias}$, which is equal to $((V_{in})^{pk})/2+((V_{in})^{pk})/2$. The circuit further has a comparator having positive and negative inputs, the bias cancelling voltage received at the negative input and the periodic input voltage received at the positive input.

DESCRIPTION OF THE PREFERRED EMBODIMENT(S)

Figure 4:
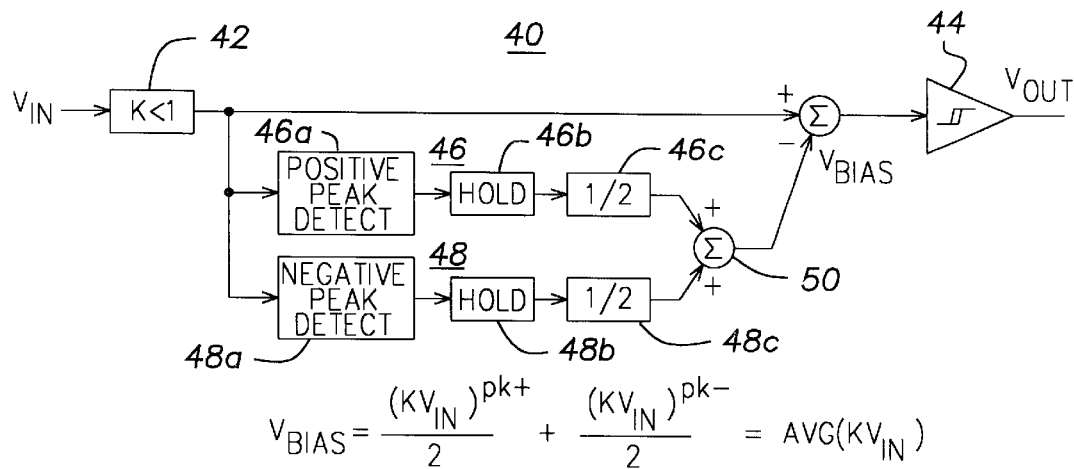
FIG. 4 shows an embodiment for the bias removal circuit of the present invention.
Figure 4:
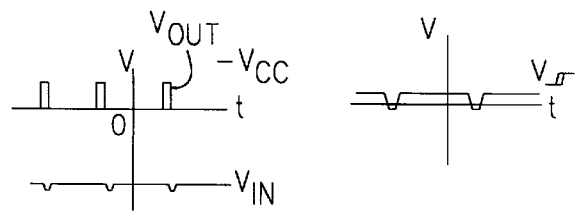

Referring now to FIG. 4 there is shown an embodiment for the pulse detection circuit 40 of the present invention. Circuit 40 includes as does circuits 10, 20 and 30 an attenuator 42 for the purpose of accepting input voltages $V_{in}$ that are well over the input range of the other portions of circuit 40. Between the attenuator 42 and the comparator 44 of circuit 40 are a first and second series connection 46 and 48 of three elements.

The three elements in connection 46, namely positive peak detector 46a, hold circuit 46b and attenuator 46c, function to provide a positive attenuated peak detected voltage, $(KV_{in})^{pk+}/2$ where the attenuation of attenuator 46c is ½. The three elements in connection 48, namely positive peak detector 48a, hold circuit 48b and attenuator 48c, function to provide a negative attenuated peak detected voltage, $(KV_{in})^{pk-}/2$ where the attenuation of attenuator 48c is ½.

The attenuated positive and negative peak detected voltages at the output of connections 46 and 48 are summed at summer 50 to provide from the input voltage $V_{in}$ a bias voltage $V_{bias}$ as follows:

$$V_{bias}=((KV_{in})^{pk+})/2+((KV_{in})^{pk-})/2.$$

It should be appreciated that the addition of the positive and negative peak detected voltages each attenuated by a factor of ½ at summer 50 gives rise to a voltage $V_{bias}$ which is the average of the voltage $KV_{in}$. The placing of the voltage $V_{bias}$ on the negative input of the comparator 44, effectively eliminates the bias that is in $V_{in}$. The comparator 44 then signals a zero crossing based solely on whether or not a pulse is generated at the input to circuit 40. When a pulse is generated, the signal seen by the comparator 44 crosses zero, causing a transition from either 0 to $+V_{cc}$ or $+V_{cc}$ to 0.

Figure 2:
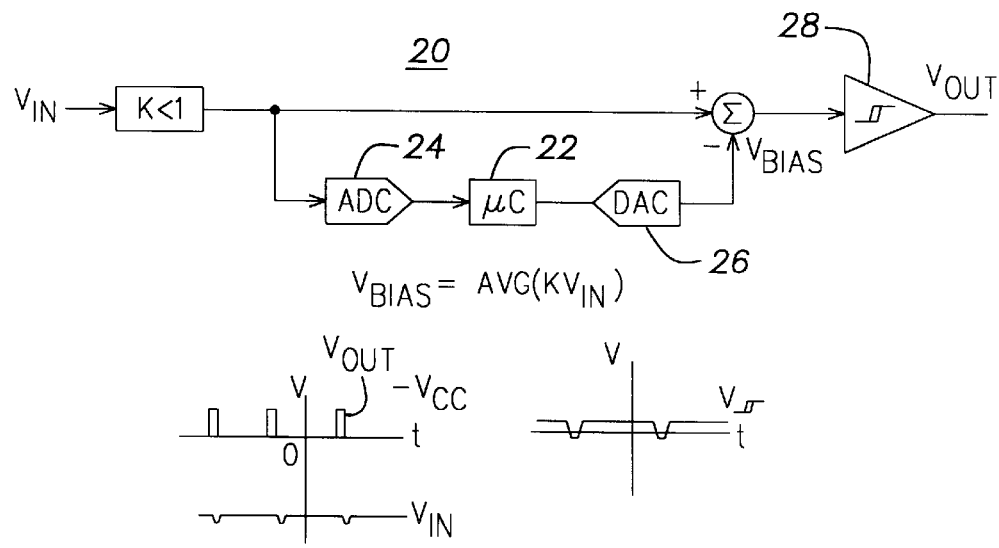
FIG. 2 shows another embodiment for a bias removal circuit of the prior art.

As in circuit of FIG. 2, the summer shown at the input to comparator 44 is symbolic. Hold circuits 46b and 48b are embodied as capacitors to store the charge associated with the pulsed input signal and hold that charge over the duration of the pulse, that is, until the occurrence of the next pulse arising from the notch in the shaft of the turbine generator. This holding of the charge until the occurrence of the next pulse avoids a false trigger of comparator 44.

Figure 1:
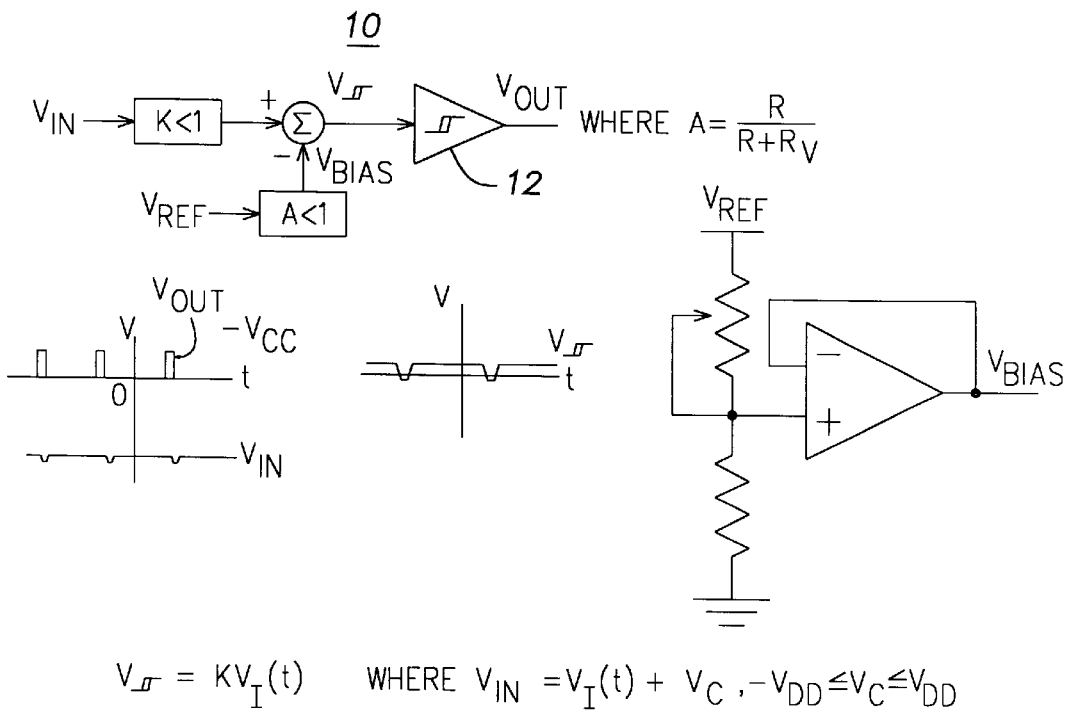
FIG. 1 shows one embodiment for a bias removal circuit of the prior art.
Figure 3:
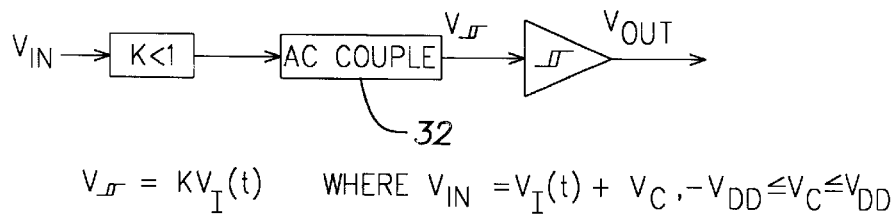
FIG. 3 shows yet another embodiment for a bias removal circuit of the prior art.
Figure 3:
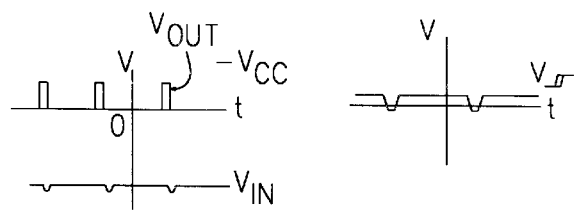

Circuit 40 achieves, as compared to circuits 10, 20, 30 of FIGS. 1, 2, 3, the highest benefit to cost ratio for the intended function. While more costly to build than circuit 10 of FIG. 1, the automatic bias removal of circuit 40 makes circuit 40 more beneficial than circuit 10. Due to the nonuse of a µC in circuit 40, the design of circuit 40 is also more beneficial than circuit 20 of FIG. 2 since consideration of demands from other circuits that could affect the performance of the bias removal circuitry is not necessary. Finally, the use of the subtraction method in circuit 40 rather than the blocking method used in circuit 30 of FIG. 3 to remove the bias increases the performance spectrum of circuit 40 over that of the circuit of FIG. 3.

While the circuit 40 of the present invention has been described in connection with a turbine generator it should be appreciated that circuit 40 may be used in connection with any rotating device that has a notch the detection of which is used to generate an event marker.

It is to be understood that the description of the preferred embodiment(s) is (are) intended to be only illustrative, rather than exhaustive, of the present invention. Those of ordinary skill will be able to make certain additions, deletions, and/or modifications to the embodiment(s) of the disclosed subject matter without departing from the spirit of the invention or its scope, as defined by the appended claims.

What is claimed is:

1. A method for generating an event marker from the periodic input voltage, $V_{in}$, received from a notch in the shaft of a rotating machine comprising the steps of:

a) detecting and attenuating a positive peak in said periodic input voltage to produce a voltage $V_{in}^{pk+}/2$;

b) detecting and attenuating a negative peak in said periodic input voltage to produce a voltage $V_{in}^{pk-}/2$;

c) combining said produced voltages $V_{in}^{pk+}/2$ and $V_{in}^{pk-}/2$ to provide a bias cancelling voltage, $V_{bias}$ as follows:

$$V_{bias}=((V_{in}))/2+((V_{in})^{pk-})/2;$$

and d) subtracting said bias cancelling voltage from said periodic input voltage to provide an output voltage representative of said event marker.

2. In combination:
a) a rotating machine having a shaft with a notch therein;
b) a circuit for generating an event marker from the periodic input voltage, $V_{in}$, received from said notch comprising:
   (i) a detector for detecting and attenuating a positive peak in said periodic input voltage to produce a voltage $V_{in}^{pk+}/2$;
   (ii) a detector for detecting and attenuating a negative peak in said periodic input voltage to produce a voltage $V_{in}^{pk-}/2$;
   (iii) a summer for combining said voltages $V_{in}^{pk+}/2$ and $V_{in}^{pk-}/2$ to produce a bias cancelling voltage, $V_{bias}$, as follows:

$$V_{bias}=((V_{in})^{pk+})/2+((V_{in})^{pk-})/2;$$

and
   (iv) a comparator having positive and negative inputs, said bias cancelling voltage received at said negative input and said periodic input voltage received at said, positive input.

3. The combination of claim 2 wherein said rotating machine is a turbine generator.

4. A circuit for generating an event marker from the periodic input voltage, $V_{in}$, received from a notch in the shaft of a rotating machine comprising:
   (a) first means for producing from a detected and attenuated positive peak in said periodic input voltage a voltage $V_{in}^{pk+}/2$, and from a detected and attenuated negative peak in said periodic input voltage a voltage $V_{in}^{pk-}/2$ and providing therefrom a bias cancelling voltage, $V_{bias}$, as follows:

$$V_{bias}=((V_{in})^{pk+})/2+((V_{in})^{pk-})/2;$$

and
   (b) second means for subtracting said bias cancelling voltage from said periodic input voltage to provide an output voltage representative of said event marker.

5. The circuit of claim 4 where said first means comprises:
   (i) a first circuit for detecting and attenuating said positive peak;
   (ii) a second circuit for detecting and attenuating said negative peak; and
   (iii) a summer for combining said detected and attenuated positive and negative peaks to produce said bias cancelling voltage.

6. The circuit of claim 4 wherein said second means is a comparator having a first input for receiving said bias cancelling voltage and a second input for receiving said input voltage.

7. The circuit of claim 4 wherein said rotating machine is a turbine generator.

8. A circuit for generating an event marker from the periodic input voltage, $V_{in}$, received from a notch in the shaft of a rotating machine comprising:
   (a) a detector for producing from a detected and attenuated positive peak in said periodic input voltage a voltage $V_{in}^{pk+}/2$;
   (b) a detector for producing from a detected and attenuated negative peak in said periodic input voltage a voltage $V_{in}^{pk-}/2$;
   (c) a summer for combining said voltages $V_{in}^{pk+}/2$ and $V_{in}^{pk-}/2$ to produce a bias cancelling voltage, $V_{bias}$, as follows:

$$V_{bias}=((V_{in})^{pk+})/2+((V_{in})^{pk-})/2;$$

and
   (d) a comparator having positive and negative inputs, said bias cancelling voltage received at said negative input and said periodic input voltage received at said positive input.

9. The circuit of claim 8 wherein said detector for producing said voltage $V_{in}^{pk+}/2$ from said periodic input voltage comprises the series combination of a circuit for detecting said positive peak in said periodic input voltage, a capacitor connected to said positive peak detecting circuit for storing and holding charge associated with one period of said periodic input voltage and an attenuator having an attenuation of ½ connected to said capacitor.

10. The circuit of claim 8 wherein said detector for producing said voltage $V_{in}^{pk-}/2$ from said periodic input voltage comprises the series combination of a circuit for detecting said negative peak in said periodic input voltage, a capacitor connected to said negative peak detecting circuit for storing and holding charge associated with one period of said periodic input voltage and an attenuator having an attenuation of ½ connected to said capacitor.

11. The circuit of claim 8 wherein said rotating machine is a turbine generator.

12. The method of claim 1 wherein all of said steps are performed continuously.

13. The combination of claim 2 wherein said circuit operates continuously.

14. The circuit of claim 4 wherein said first means for detecting the presence of a positive peak in said periodic input voltage and for the presence of a negative peak in said periodic input voltage and said second means each operate continuously.

15. The circuit of claim 8 wherein said detector for producing said voltage $V_{in}^{pk+}/2$, said detector for producing said voltage $V_{in}^{pk-}/2$, said summer and said comparator each operate continuously.

* * * * *